United States Patent [19]

Park

[11] Patent Number: 5,546,235

[45] Date of Patent: Aug. 13, 1996

[54] ASTIGMATIC LENS FOR USE IN DETECTING A FOCUSSING ERROR IN AN OPTICAL PICKUP SYSTEM

[75] Inventor: Chan-Kyu Park, Seoul, Rep. of Korea

[73] Assignee: Daewoo Electronics Co., Ltd., Seoul, Rep. of Korea

[21] Appl. No.: 334,288

[22] Filed: Nov. 4, 1994

[30] Foreign Application Priority Data

Nov. 5, 1993 [KR] Rep. of Korea ................. 1993-23461

[51] Int. Cl.⁶ .............................. G02B 3/08; G02B 5/18
[52] U.S. Cl. ............................................ 359/742; 359/571
[58] Field of Search ........................................ 359/742, 571

[56] References Cited

U.S. PATENT DOCUMENTS

| | | | |
|---|---|---|---|
| 4,023,033 | 5/1977 | Bricot et al. | 250/201.5 |
| 4,824,227 | 4/1989 | Goldenberg et al. | 359/742 |
| 5,002,383 | 3/1991 | Sisler | 359/742 |

FOREIGN PATENT DOCUMENTS

| | | | |
|---|---|---|---|
| 0600353 | 6/1978 | Switzerland | 359/742 |
| 2021807 | 12/1979 | United Kingdom | 359/742 |

*Primary Examiner*—Georgia Y. Epps
*Assistant Examiner*—Evelyn A. Lester

*Attorney, Agent, or Firm*—Anderson Kill Olick & Oshinsky, P.C.

[57] ABSTRACT

A cylindrical astigmatic lens is used conventionally in detecting focussing errors in an optical pickup system. The inventive astigmatic lens is comprised of an orthorhombic base, made of a refractive material, provided with two parallel surfaces and a centerplane perpendicular thereto, and two sets of M pentahedrons, made of the same refractive material, placed on one of the two parallel surfaces thereof in such a way that each set of M pentahedrons is symmetric with respect to the centerplane. Each of the pentahedrons consists of three rectangular surfaces and two right angled triangular side surfaces, each of the triangular side surfaces being defined by a height $H_m$, a base $R_m$ and an inclination. Since the height is the same in all of the triangular side surfaces in the M pentahedrons, the dimension of each pentahedron in the inventive astigmatic lens is defined by $R_m$, $R_m$ being expressed as $$R_m = \sqrt{2mf\lambda - 2(m-1)f\lambda}$$

wherein f represents the focus length and λ is the wavelength of the light source with the inventive astigmatic lens, it is possible to improve the alignment accuracy of the optical pickup system, since the inventive astigmatic lens being planar.

5 Claims, 5 Drawing Sheets

ASTIGMATIC LENS FOR USE IN DETECTING A FOCUSSING ERROR IN AN OPTICAL PICKUP SYSTEM

FIELD OF THE INVENTION

The present invention relates to an optical pickup system; and, more particularly, to an optical pickup system capable of detecting a focussing error by incorporating therein an improved astigmatic lens.

BACKGROUND OF THE INVENTION

One of the common difficulties in an optical information recording disk, e.g., laser disk, relates to the occurrence of focussing errors. An astigmatic method has been introduced to solve the problem.

In FIG. 1, there is illustrated a prior art optical pickup system 10 utilizing the astigmatic method, as disclosed in U.S. Pat. No. 4,023,033, entitled "Optical Focussing Device" and is incorporated herein by reference. The optical pickup system 10 comprises a light source 12, a beam splitter 16, an objective lens 18, an optical information recording disk 20 (hereinafter, referred to as an optical disk), a cylindrical lens 26 and an optical detector 28. In the system, a light beam 14 emitted from the light source 12, e.g., a laser diode, enters the beam splitter 16 and is partially reflected by a reflection surface 22 incorporated therein. The light beam reflected from the reflection surface 22 is radiated through the objective lens 18 onto a recording surface 21 of the optical disk 20 as a focussed light beam. The focussed light beam reflected from the optical disk 20 is converged by the objective lens 18 and transmitted through the beam splitter 16. The focussed light beam transmitted through the beam splitter 16 is made astigmatic by its passage through the cylindrical lens 26 and thereafter is made to impinge onto the optical detector 28 including a light-reception surface 29 having four square photoelectric cells(not shown) arranged to form a square. Each of the photoelectric cells generates an output in the form of a light intensity measurement. Two outputs from two opposite corners of the square light-reception surface are sent to a first adder and two outputs from the remaining two opposite corners are sent to a second adder, respectively. Results from the first and second adders are then sent to a differential amplifier (not shown) which will in turn generate an associated focussing error by comparing the outputs from the first and second adders, the focussing error simply being a difference of the two outputs from the pair of adders.

Being astigmatic, the shape of the luminous flux imaged on the light-reception surface 29 of the optical detector 28 changes depending on the positional relationship between the recording surface 21 of the optical disk 20 and a convergence point 19 of the light beam. In order to detect this change in the shape of the luminous flux, the cylindrical lens 26 is arranged exactly between the convergence point 19 and the optical detector 28 in such a way that the light-reception surface 29 is disposed at the position where the shape of the luminous flux becomes circular when the light beam is focussed (zero focussing error) and this is known a "just focussed" position. If the optical disk 20 is displaced in a vertical direction from the just focussed position to the optical detector 28, the focussing error signal becomes non-zero with the sign indicating the direction of displacement, thereby detecting the focussing error. This conventional astigmatism method requires a cylindrical lens to focus a beam spot in an astigmatic manner. Since, however, the conventional cylindrical lens employed therein is not planar, it is rather difficult to align it accurately with the convergence point 19 and the optical detector 28 such that the light-reception surface 29 is disposed at the position where the shape of the luminous flux becomes circular.

SUMMARY OF THE INVENTION

It is, therefore, a primary object of the present invention to provide an improved astigmatic lens for use in an optical pickup system that can be aligned accurately with a convergence point and an optical detector such that a light-reception surface on the detector is disposed at the position of zero focussing error.

In accordance with the present invention, there is provided a convex astigmatic lens for use in an optical pickup system comprising: an orthorhombic base, made of a refractive material, having a first and a second surfaces, and provided with a vertically directional centerplane, wherein the first and second surfaces are parallel to each other, each of the surfaces being provided with a pair of widthwise sides and a pair of lengthwise sides, and the centerplane is perpendicular to the first and second surfaces; and two sets of M pentahedrons placed on the first surface of said orthorhombic base, each of the pentahedrons in each set being made of said refractive material and having a rectangular base surface, a rectangular inclined surface, a rectangular normal surface and a pair of right angled triangular parallel side surfaces, each of the three rectangular surfaces being provided with a pair of lengthwise sides and a pair of widthwise sides and each of the triangular side surfaces having a base $R_m$, a height $H_m$, and an inclination, m being a natural number indicating the number of the order, said base, height and inclination of the pair of triangular side surfaces of each pentahedron being defined by the pair of widthwise sides of the rectangular base, rectangular normal and rectangular inclined surfaces of the corresponding pentahedron, respectively, the height $H_m$ of the triangular side surfaces in each of the M pentahedrons being equal, each of the pentahedrons being formed by joining one of the lengthwise sides of the rectangular inclined surface with one of the lengthwise sides of the rectangular normal surface at an angle $\Theta_m$, thereby forming a first edge, one of the lengthwise sides of the rectangular base surface with the remaining lengthwise side of the rectangular normal surface at a right angle to thereby form a second edge, and the remaining lengthwise side of the rectangular base surface with the remaining lengthwise side of the rectangular inclined surface at an angle ($\Theta_m < 90°$), thereby forming a third edge, the first, second and third edges of the M pentahedrons being parallel to each other, the second edge of each of the M pentahedrons being collinear to the third edge of a neighboring pentahedron with the exception of the pentahedrons having the triangular side surfaces with the largest $R_m$ and the shortest $R_m$, the rectangular surfaces of the pentahedron having the triangular side surfaces with the largest base $R_m$ from each set sharing the same rectangular surface, the third edge of the pentahedrons having the triangular side surfaces with the shortest $R_m$ from each set being collinear to the lengthwise sides of the first surface, respectively, and the rectangular base surfaces of the M pentahedrons from the two sets and the first surfaces of the orthorhombic base being also coplanar, thereby allowing the two sets of M pentahedrons to be symmetrical with respect to the centerplane, the angle $\Theta_m$ for each of the M pentahedrons being further determined by the base $R_m$ of the triangular side surfaces of the corresponding pentahedron, the base $R_m$ being mathematically expressed as $$R_m = \sqrt{2mf\lambda - 2(m-1)f\lambda}$$

wherein f represents the focus length and $\lambda$, the wavelength of the light source.

In accordance with another aspect of the present invention, there is provided a concave astigmatic lens for use in an optical pickup system comprising: an orthorhombic base, made of a refractive material, having with a first, a second, a third and a fourth surfaces, and provided with a vertically directional centerplane, wherein the first and second surfaces are parallel to each other, the third and fourth surfaces also being parallel each other, each of the surfaces being provided with a pair of widthwise sides and a pair of lengthwise sides, and the centerplane is perpendicular to the first and second surfaces; and two sets of M pentahedrons, placed on the first surface of said orthorhombic base, each of the pentahedrons in each set being made of said refractive material and having a rectangular base surface, a rectangular inclined surface, a rectangular normal surface and a pair of right angled triangular parallel side surfaces, each of the three rectangular surfaces being provided with a pair of lengthwise sides and a pair of widthwise sides and each of the triangular side surfaces having a base $R_m$, a height $H_m$, and an inclination, m being a natural number indicating the number of order, said base, height and inclination of the pair of triangular side surfaces of each pentahedron being defined by the pair of widthwise sides of the rectangular base, rectangular normal and rectangular inclined surfaces of the corresponding pentahedron, respectively, the height $H_m$ of the triangular side surfaces in each of the M pentahedrons being equal, each of the pentahedrons being formed by joining one of the lengthwise sides of the rectangular inclined surface with one of the lengthwise sides of the rectangular surface at an angle $\Theta_m$, thereby forming a first edge, one of the lengthwise sides of the rectangular base surface with the remaining lengthwise side of the rectangular inclined surface at a right angle to thereby form a second edge, and the remaining lengthwise side of the rectangular base surface with the remaining lengthwise side of the rectangular normal surface at an angle ($\Theta_m < 90°$) thereby forming a third edge, the first, second and third edges of the M pentahedrons being parallel to each other, the second edge of each of the M pentahedrons are collinear with the third edge of a neighboring pentahedron with the exception of the pentahedrons having the triangular side surfaces with the largest $R_m$ and the shortest base $R_m$ from each set, the pentahedrons having the triangular side surfaces with the largest $R_m$ from each set sharing the third edge, the rectangular surfaces of pentahedrons having the triangular side surfaces with the shortest $R_m$ being on the same plane as the third and fourth surfaces of the orthorhombic base, respectively, and rectangular bases of the pentahedrons from the two sets and the first surface of the orthorhombic base being also coplanar, thereby allowing the two sets of M pentahedrons to be symmetrical with respect to the centerplane, the angle $\Theta_m$ for each of the M pentahedrons being further determined by the base $R_m$ of the triangular side surfaces of the corresponding pentahedron, the base $R_m$ being mathematically expressed as $$R_m = \sqrt{2mf\lambda - 2(m-1)f\lambda}$$

wherein f represents the focal length and $\lambda$, the wavelength of the light source.

BRIEF DESCRIPTION OF THE DRAWINGS

The present invention together with the above and other objects and advantages will become more apparent from the following description of preferred embodiment given in conjunction with the accompanying drawings, wherein.

DETAILED DESCRIPTION OF THE PREFERRED EMBODIMENT

Figure 2A:
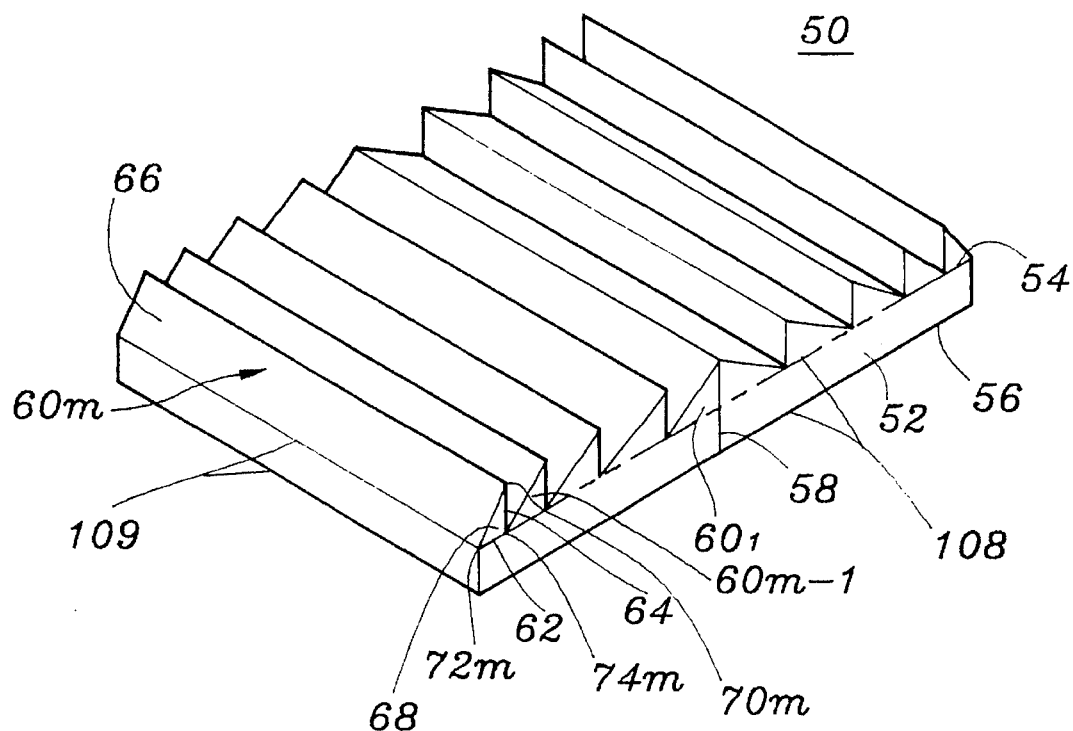
FIG. 2A illustrates a perspective view of the inventive convex astigmatic lens in accordance with a preferred embodiment of the present invention.
Figure 2B:
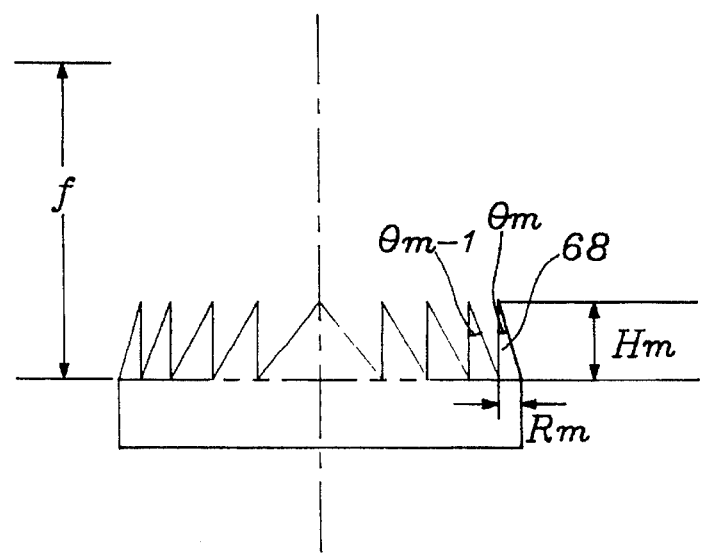
FIG. 2B shows a schematic cross-sectional view of the inventive convex astigmatic lens taken along the line V—V shown in FIG. 2A.
Figure 2C:
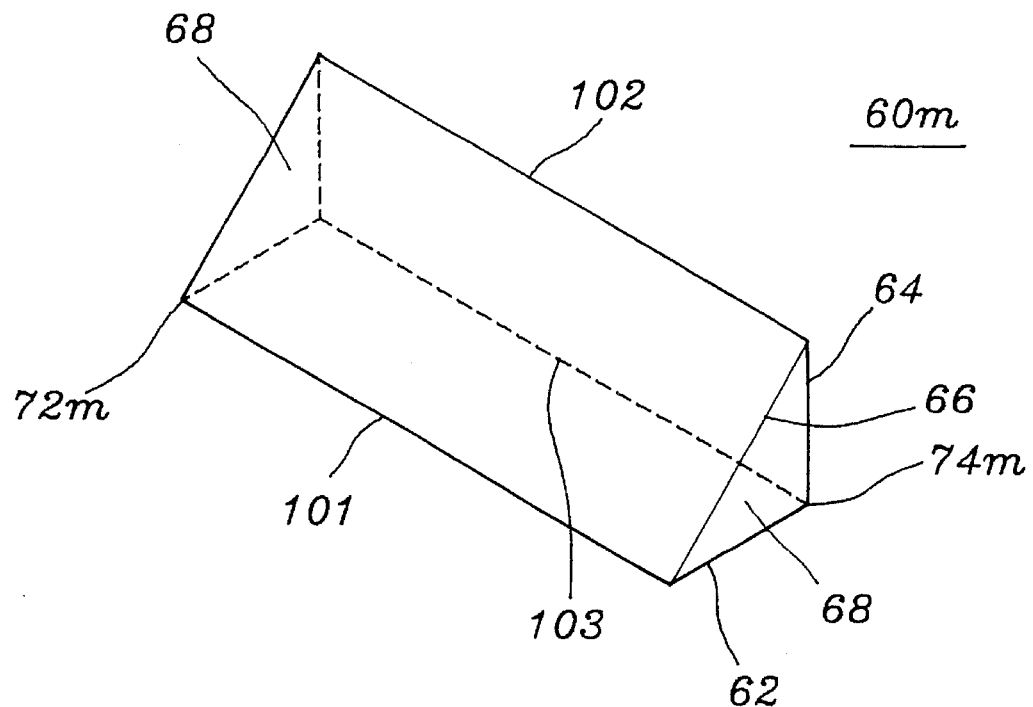
FIG. 2C represents a perspective view of a pentahedron of the inventive convex astigmatic lens shown in FIG. 2A.
Figure 3C:
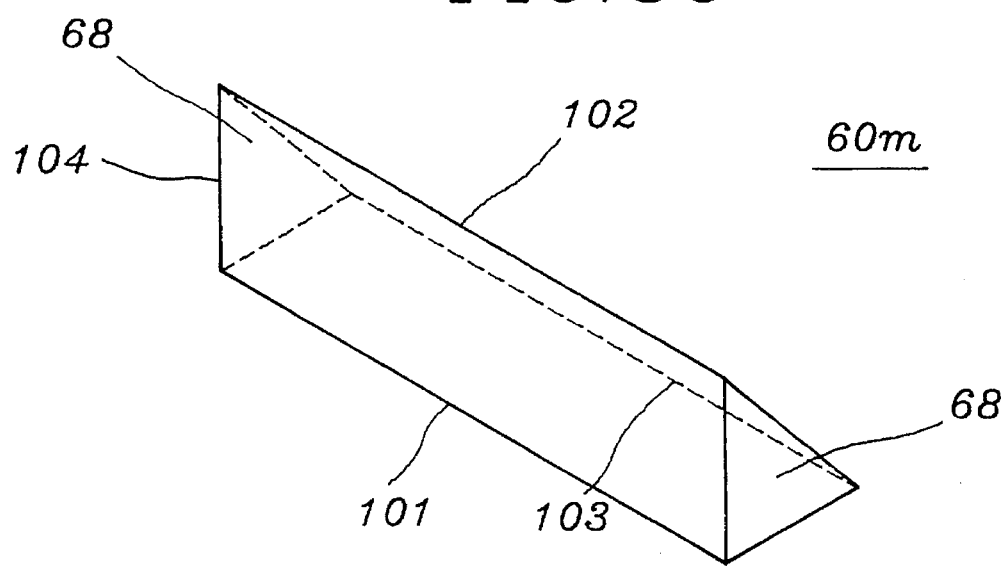
FIG. 3C depicts a perspective view of a pentahedron of the inventive concave astigmatic lens shown in FIG. 3A.
Figure 3A:
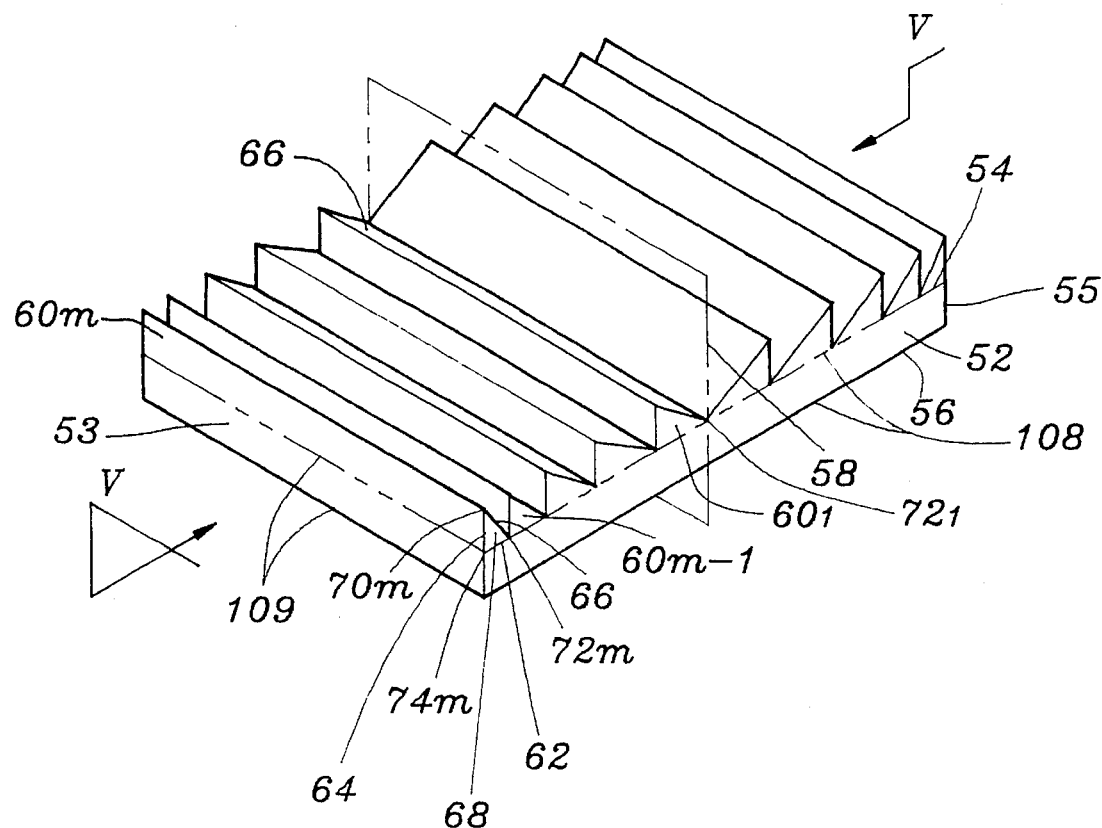
FIG. 3A is a perspective view of the inventive concave astigmatic lens in accordance with another preferred embodiment of the present invention.
Figure 3B:
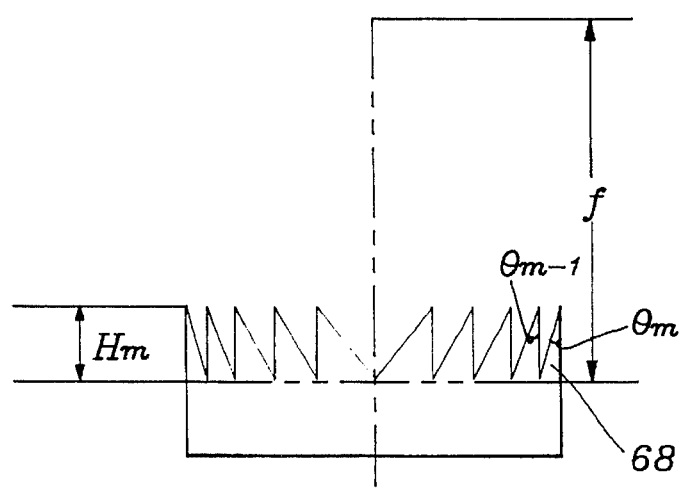
FIG. 3B provides a cross-sectional view of the inventive concave astigmatic lens taken along the line V—V shown in FIG. 3A.
Figure 4:
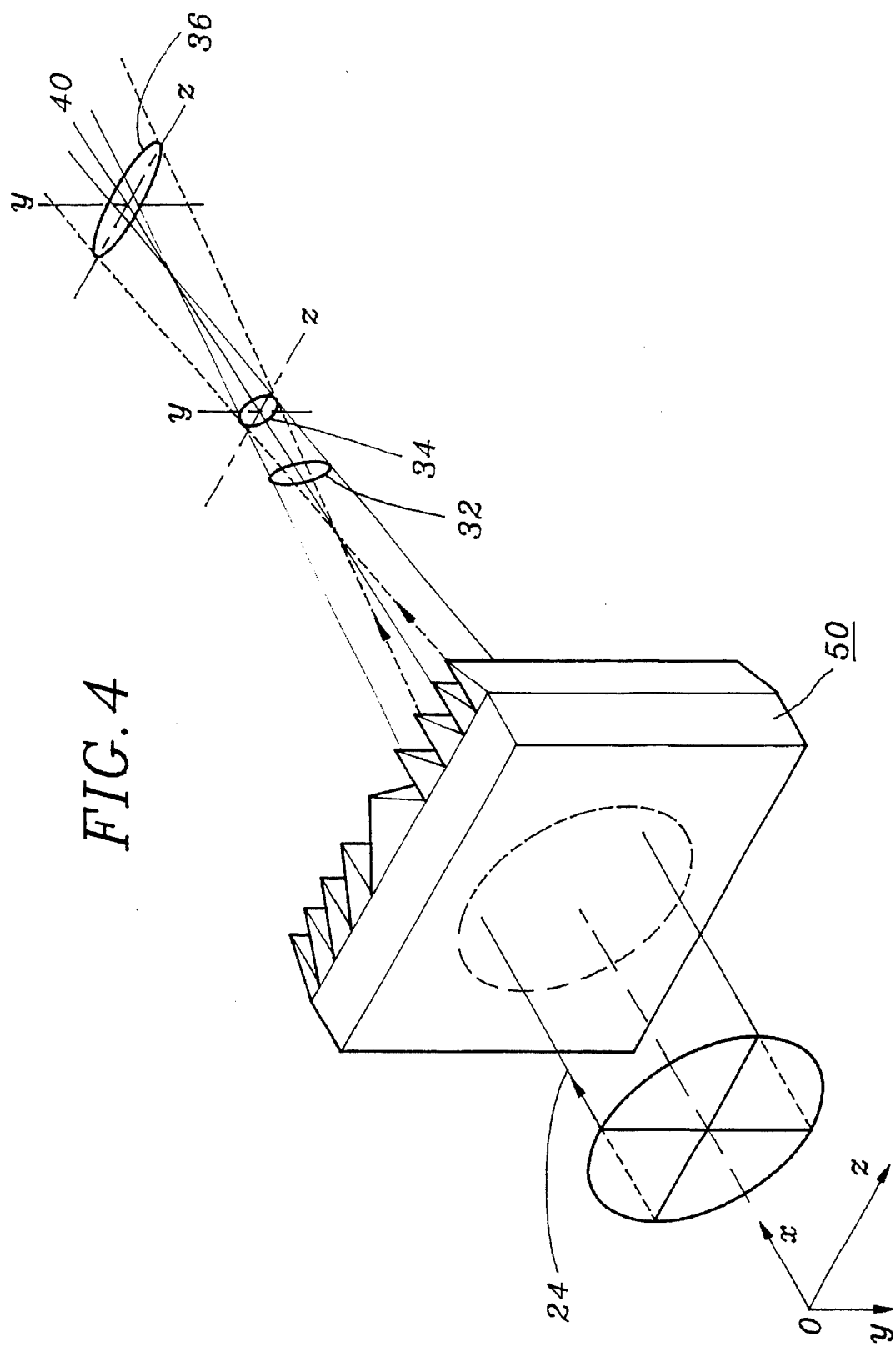
FIG. 4 depicts a perspective view of the astigmatic method utilizing one of the inventive astigmatic lens.

There are illustrated in FIGS. 2, 3 and 4 perspective and cross-sectional views of the inventive astigmatic lens in accordance with the preferred embodiments of the present invention. It should be noted that like parts appearing therein have like reference numerals.

There is illustrated in FIG. 2A a perspective view of the inventive convex astigmatic lens 50 for use in optical pickup system, capable of detecting focussing errors, comprising an orthorhombic base 52, and two sets of M pentahedrons made of a refractive material, e.g., PMMA(Poly Methyl Meta Acryllrate), PC(Poly Carbonate) and PS(Poly Styrate).

The orthohombic base 52 has a first, a second surface, a third and a fourth surfaces 54, 56, 53, 55 and is provided with a vertically directional centerplane 58, wherein the first and second surfaces 54, 56 are parallel to each other, each of the first and second surfaces being provided with a pair of aerie sides 108 and a pair of lengthwise sides 109, the third and fourth surfaces are also parallel to each other and the centerplane is perpendicular to the first and second surfaces 54, 56.

The two sets of M pentahedrons $60m$ are placed on top of the first surface 54 of the orthohombic base 52, each of the pentahedrons $60_m$ in each set is provided with a rectangular base surface 62, a rectangular inclined surface 66, a rectangular normal surface 64 and a pair of right angled triangular parallel side surfaces 68. The subscript m is a natural number indicating the number of the order. Each of the three rectangular surfaces are further provided with a pair of lengthwise sides and a pair of aerie sides and each of the triangular side surfaces 68 has a base $R_m$, a height $H_m$, and an inclination, the base, height and inclination of the pair of triangular side surfaces of each pentahedron being defined by a pair of the aerie sides of the rectangular base, rectangular normal and rectangular inclined surfaces 62, 64, 66, respectively.

As shown in FIG. 2B, the base $R_m$ and the height $H_m$ are determined by the following equations:

$$\sqrt{R_m^2 + f^2} - f = m\lambda, \quad \text{eq. (1)}$$

$$R_m = \sqrt{2mf\lambda + m^2\lambda^2} - \sqrt{2(m-1)f\lambda + (m-1)^2\lambda^2}, \quad \text{eq. (2)}$$

$$H_m = \frac{\lambda}{n_s - \frac{f}{\sqrt{R_m^2 + f^2}}} \quad \text{eq. (3)}$$

wherein f represents the focal length, $\lambda$, the wavelength of the light source, $n_s$, the reflection index of the astigmatic lens. In the case when $f \gg R_m^2$, eq (3) may be reduced to:

$$H_m \approx \frac{\lambda}{n_s - 1} \quad \text{eq. (4)}$$

Since $n_s$ is a constant, the height $H_m$ of the triangular side surfaces in each of the M pentahedrons $60m$ is approximately equal.

Shown in FIGS. 2B and 2C, each of the pentahedrons is formed by joining one of the lengthwise sides 101, 102 of the rectangular inclined surface 66 with one of the lengthwise sides 102, 103 of the rectangular normal surface 64 at an angle $\Theta_m$, thereby forming a first edge $70_m$, one of the lengthwise sides 101, 103 of the rectangular base surface 62 with the remaining lengthwise side 103 of the rectangular normal surface 64 at a right angle to thereby form a second edge $74_m$, and the remaining lengthwise side 101 of the rectangular base surface 62 with the remaining lengthwise side 101 of the rectangular inclined surface 66 at an angle ($\Theta < 90°$), thereby forming a third edge $72m$. The first, second and third edges of the M pentahedrons $70_m$, $74_m$, $72_m$ are parallel to each other, the second edge $74_m$ of each of the M pentahedrons $60_m$ are collinear to the third edge $72_{m-1}$ of neighboring pentahedron $60_{m-1}$ with the exception of the pentahedron $60_1$ having the triangular side surfaces 68 with the largest and shortest base $R_m$. The rectangular normal surfaces 64 of the pentahedron $60_1$ having the triangular side surfaces 68 with the largest base $R_m$ from each set shares the same rectangular normal surfaces 64, the third edge $72_m$ of the pentahedron $60_m$ having the triangular side surfaces 68 with the shortest base $R_m$ from each set being collinear to the lengthwise sides of the first surface 54 and the rectangular bases 62 of the pentahedrons $60_m$ from the two sets and the first surface 54 of the orthorhombic base 52 being also coplanar, thereby allowing the two sets of M pentahedrons $60_m$ to be symmetrical with respect to the centerplane 58.

The angle $\Theta_m$ is determined by the base $R_m$. Since the wavelength of the light source, $\lambda$, is conventionally 780±10 nm and the focal length is about 5 mm, $2 mf\lambda \gg m^2\lambda^2$, allowing the eq. (2) to be further reduced to $$R_m \approx \sqrt{2mf\lambda - 2(m-1)f\lambda} \quad \text{(eq. 5)}$$

As a second preferred embodiment, there are illustrated in FIGS. 3A and 3C two perspective and a cross-sectional views of the inventive concave astigmatic lens 50 for use in the optical pickup system.

The inventive concave astigmatic lens 50 is similar to the inventive convex astigmatic lens except that the pentahedrons $60_m$ having the triangular side surfaces 68 with the largest $R_m$ from each set share the same third edge and the rectangular side normal surfaces of the pentahedrons having the triangular side surfaces with the shortest $R_m$ are on the same plane as the third and fourth surfaces of the orthorhombic base, respectively.

Figure 1:
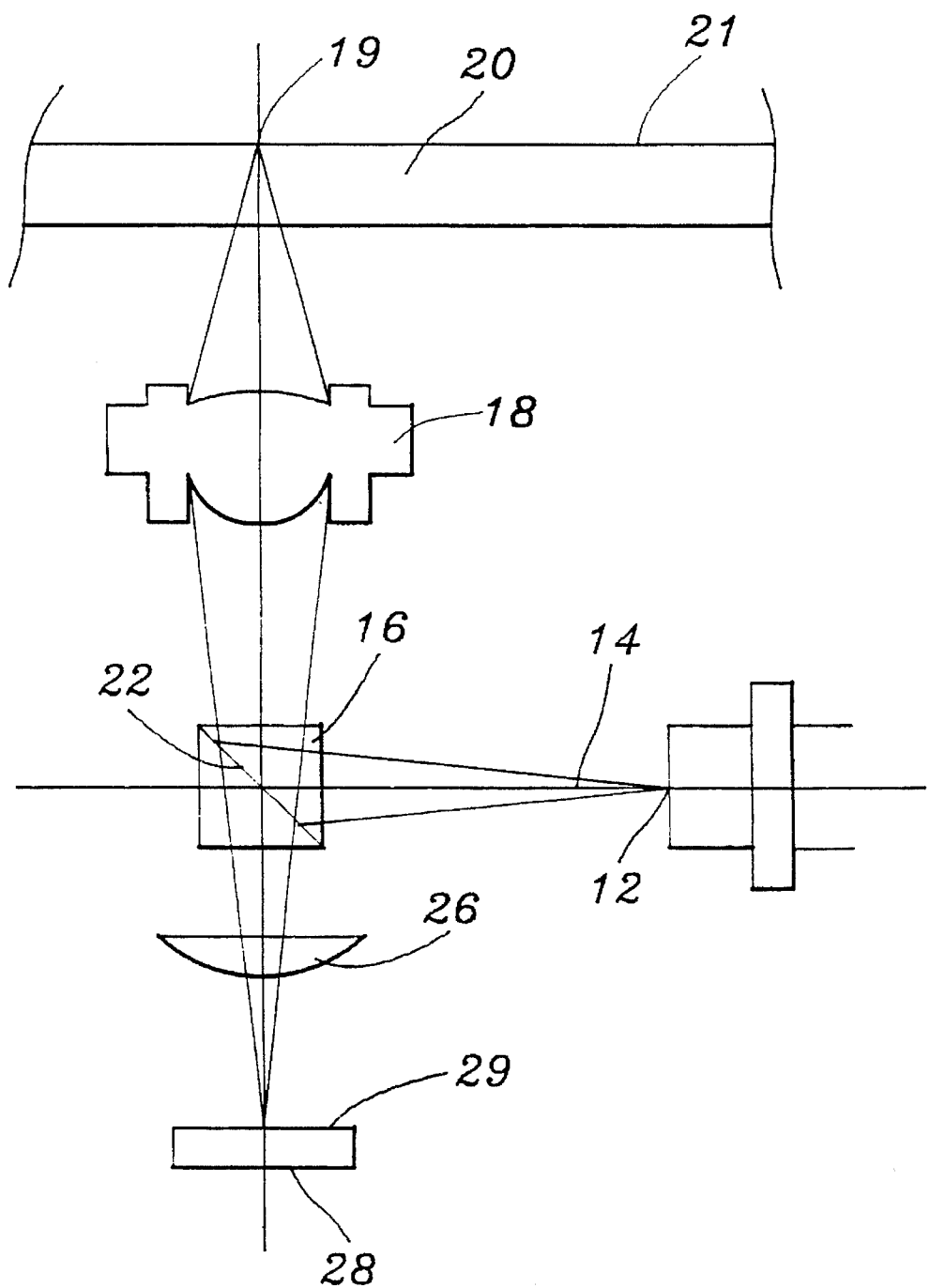
FIG. 1 represents a schematic view of a prior art optical pickup system utilizing a cylindrical lens.

In FIG. 4, there is depicted a schematic view of an astigmatic method incorporating the inventive astigmatic lens. The inventive astigmatic lens 50 serves similar functions as those of the cylindrical lens shown in FIG. 1, allowing the z-axis to act as the conventional collimating lens, x-axis as the optical axis and y-axis as a plane glass. There is interposed on the axis 40 the inventive astigmatic lens 50 arranged in the path of a transmitting light 24 to thereby render the optical system astigmatic in character. As those skilled in the art will understand, the transmitted light will form a circular beam spot 34 imaged on the yz-plane when the optical disk is placed at the just focussed position, an elliptic beam spot 32 elongated in the y-axis direction at the position ahead of the just focussed position when the optical disk is moved from the just focussed position to the optical detector, an elliptic beam spot 36 elongated in the z-axis direction at the position beyond the just focussed position when the optical disk is moved from the just focussed position to the optical detector.

As described above, it should appreciated that the use of the inventive astigmatic lens in place of a conventional cylindrical lens in an optical pickup system will improve the alignment accuracy since the inventive astigmatic lens is planar, which will in turn allow easier assembly thereof.

While the present invention has been described with respect to the preferred embodiment, other modifications and variations may be made without departing from the scope of the present invention as set forth in the following claims.

What is claimed is:

1. A convex astigmatic lens for use in an optical pickup system comprising:

an orthorhombic base, made of a refractive material, having a first and a second surfaces, and provided with a vertically directional centerplane, wherein the first and second surfaces are parallel to each other, each of the surfaces being provided with a pair of aerie sides and a pair of lengthwise sides, and the centerplane is perpendicular to the first and second surfaces; and two sets of M pentahedrons placed on the first surface of said orthorhombic base, each of the pentahedrons in each set being made of said refractive material and having a rectangular base surface, a rectangular inclined surface, a rectangular normal surface and a pair of right angled triangular parallel side surfaces, each of the three rectangular surfaces being provided with a pair of lengthwise sides and a pair of aerie sides and each of the triangular side surfaces having a base $R_m$, a height $H_m$, and an inclination, m being a natural number indicating the number of the order, said base, height and inclination of the pair of triangular side surfaces of each pentahedron being defined by the pair of aerie sides of the rectangular base, rectangular normal and rectangular inclined surfaces of the corresponding pentahedron, respectively, the height $H_m$ of the triangular side surfaces in each of the M pentahedrons being equal, each of the pentahedrons being formed by joining one of the lengthwise sides of the rectangular inclined surface with one of the lengthwise sides of the rectangular normal surface at an angle $\Theta_m$, thereby forming a first edge, one of the lengthwise sides of the rectangular base surface with the remaining lengthwise side of the rectangular inclined surface at a right angle to thereby form a second edge, and the remaining lengthwise side of the rectangular base surface with the remaining lengthwise side of the rectangular inclined surface at an angle ($\Theta_m < 90°$), thereby forming a third edge, the first, second and third edges of the M pentahedrons being parallel to each other, the second edge of each of the M pentahedrons being collinear to the third edge of a neighboring pentahedron with the exception of the pentahedrons having the triangular side surfaces with the largest $R_m$ and shortest $R_m$, the rectangular surfaces of the pentahedron having the triangular side surfaces with the largest base $R_m$ from each set sharing the same rectangular surface, the third edge of the pentahedrons having the triangular side surfaces with the shortest $R_m$ from each set being collinear to the lengthwise sides of the first surface, respectively, and the rectangular base surfaces of the M pentahedrons from the two sets and the first surface of the orthorhombic base being also coplanar, thereby allowing the two sets of M pentahedrons to be symmetrical with respect to the centerplane, the angle $\Theta_m$ for each of the M pentahedrons being further determined by the $R_m$ of the triangular side surfaces of the corresponding pentahedron, the base $R_m$ being mathematically expressed as $$R_m \simeq \sqrt{2mf\lambda - 2(m-1)f\lambda}$$

wherein f represents the focus length and $\lambda$, the wavelength of the light source.

2. A concave astigmatic lens for use in an optical pickup system comprising:

an orthorhombic base, made of a refractive material, having a first, a second, a third and a fourth surfaces, and provided with a vertically directional centerplane, wherein the first and second surfaces are parallel to each other, the third and fourth surfaces also being parallel to each other, each of the surfaces being provided with a pair of aerie sides and a pair of lengthwise sides, and the centerplane is perpendicular to the first and the second surfaces; and two sets of M pentahedrons, placed on the first surface of said orthorhombic base, each of the pentahedrons in each set being made of said refractive material and having a rectangular base surface, a rectangular inclined surface, a rectangular normal surface and a pair of right angled triangular parallel side surfaces, each of the three rectangular surfaces being provided with a pair of lengthwise sides and a pair of aerie sides and each of the triangular side surfaces having a base $R_m$, a height $H_m$, and an inclination, m being a natural number indicating the number of the order, said base, height and inclination of the pair of triangular side surfaces of each pentahedron being defined by the pair of aerie sides of the rectangular base, rectangular normal and rectangular inclined surfaces of the corresponding pentahedron, respectively, the height $H_m$ of the triangular side surfaces in each of the M pentahedrons being equal, each of the pentahedrons being formed by joining one of the lengthwise sides of the rectangular inclined surface with one of the lengthwise sides of the rectangular normal surface at an angle $\Theta_m$, thereby forming a first edge, one of the lengthwise sides of the rectangular base surface with the remaining lengthwise side of the rectangular inclined surface at a right angle to thereby form a second edge, and the remaining lengthwise side of the rectangular base surface with the remaining lengthwise side of the rectangular normal surface at an angle ($\Theta_m < 90°$) thereby forming a third edge, the first, second and third edges of the M pentahedrons being parallel to each other, the second edge of each of the M pentahedrons being collinear with the third edge of neighboring pentahedrons with the exception of the pentahedron having the triangular side surfaces with the largest $R_m$ and the shortest base $R_m$ from each set, the pentahedrons having the triangular side surfaces with the largest $R_m$ from each set sharing the third edge, the rectangular surfaces of pentahedrons having the triangular side surfaces with the shortest $R_m$ being on the same plane as the third and fourth surfaces of the orthorhombic base, respectively, and rectangular bases of the pentahedrons from the two sets and the first surface of the orthorhombic base being also coplanar, thereby allowing the two sets of M pentahedrons to be symmetrical with respect to the centerplane, the angle $\Theta_m$ for each of the M pentahedrons being further determined by the base $R_m$ of the triangular side surfaces of the corresponding pentahedron, the base $R_m$ being mathematically expressed as $$R_m \simeq \sqrt{2mf\lambda - 2(m-1)f\lambda},$$

wherein f represents the focal length and $\lambda$, the wavelength of the light source.

3. The astigmatic lens of claims 1 or 2, wherein the refractive material is made of a poly methyl meta acryllrate(PMMA).

4. The astigmatic lens of claims 1 or 2, wherein the refractive material is made of a poly carbonate(PC).

5. The astigmatic lens of claims 1 or 2, wherein the refractive material is made of a poly styrate(PS).

* * * * *